United States Patent [19]

Leünig

[11] 4,454,755
[45] Jun. 19, 1984

[54] METHOD FOR TESTING A CARBURETOR

[75] Inventor: Ernst Leünig, Wolfsburg, Fed. Rep. of Germany

[73] Assignee: Volkswagenwerk Aktiengesellschaft, Wolfsburg, Fed. Rep. of Germany

[21] Appl. No.: 411,340

[22] Filed: Aug. 25, 1982

[30] Foreign Application Priority Data

Sep. 22, 1981 [DE] Fed. Rep. of Germany ....... 3137562

[51] Int. Cl.$^3$ .......................................... G01M 15/00
[52] U.S. Cl. .................................................. 73/118
[58] Field of Search ........................... 73/118, 116, 113

[56] References Cited

U.S. PATENT DOCUMENTS 3,646,600 2/1972 Bier et al. ................................ 73/118
4,041,777 8/1977 Leunig et al. ........................... 73/118

Primary Examiner—Jerry W. Myracle
Attorney, Agent, or Firm—Brumbaugh, Graves, Donohue & Raymond

[57] ABSTRACT

Carburetors are tested using a flow-testing bench which includes a first and second critical flowthrough nozzle arrangement, arranged upstream and downstream, respectively, of the carburetor, and a third critical flowthrough nozzle arrangement which by-passes the carburetor intake pipe. The first and third nozzles are adjustable in cross-section, and are used to regulate the carburetor air throughput and the pressure downstream of the carburetor. These parameters, along with the carburetor throttle valve position, are varied to simulate various operating flow conditions of the carburetor. The fuel delivery rate is measured, and the fuel-to-air ratio determined, for such operating conditions to assure proper functioning of the carburetor. The method permits dynamic measurements to be made on a carburetor being tested.

1 Claim, 1 Drawing Figure

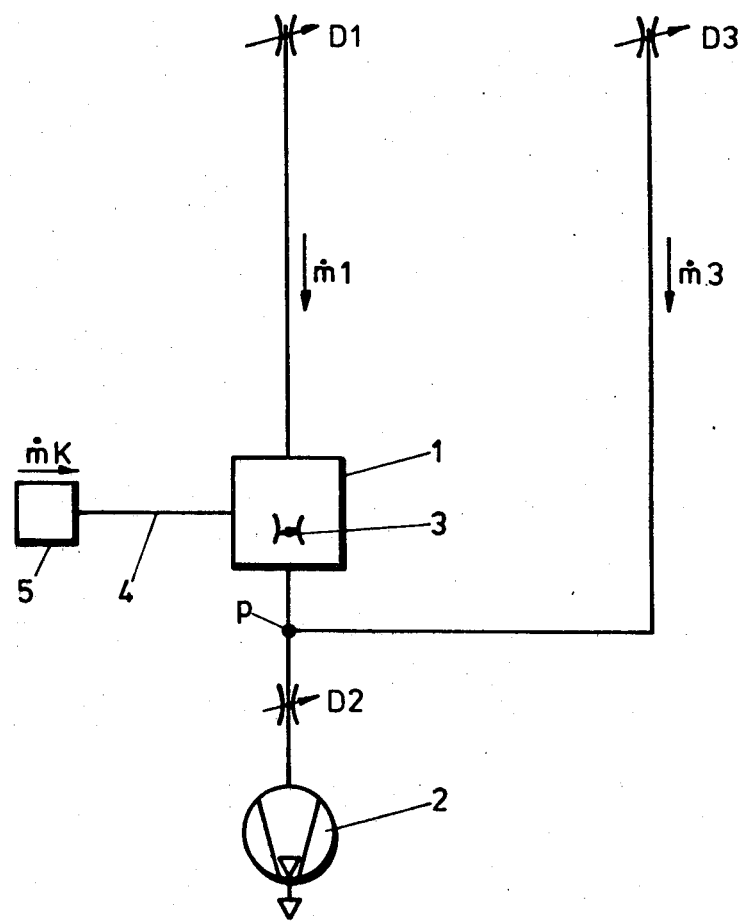

METHOD FOR TESTING A CARBURETOR

BACKGROUND OF THE INVENTION

The invention concerns a method for bench testing a carburetor for an internal combustion engine.

U.S. Pat. No. 4,041,777 discloses a method for testing carburetors on a flow-testing bench using a combination of three critical flowthrough nozzles. In the method described therein, the output of the first critical flowthrough nozzle communicates with the air intake passage of the carburetor. In a critical flowthrough nozzle, fluid flows through the narrowest section of the nozzle at the speed of sound. By using such a nozzle, a predetermined, constant throughput rate of air can be maintained and directed through the carburetor for calibration purposes. The second cricital flowthrough nozzle has its input connected to the output of the carburetor, and maintains a steady pressure on the downstream side.

When testing engine carburetors, in addition to air, fuel is metered into the carburetor. Due to the presence of the fuel it is difficult to maintain a constant pressure at the output of the carburetor by using only the second critical flowthrough nozzle. The third critical flowthrough nozzle, which by-passes the carburetor, is present to supply air to the output of the carburetor for the purpose of thinning the fuel-air mixture which is supplied to the input of the second cricital flowthrough nozzle, and thereby assure a constant downstream pressure.

The head pressure, i.e. the pressure at the input of the carburetor, is measured and compared with a desired value associated with a model carburetor. If there is a difference between the measured pressure and the desired pressure, the position of the throttle valve of the carburetor is adjusted to compensate for the difference.

With the above-described method for testing a carburetor, it is not possible to perform dynamic measurements on a carburetor being tested. Specifically, it is not possible to determine the characteristics of a carburetor for throttle valve positions varied as a function of time. In order to change test conditions, reconstruction of the flow-testing bench is necessary.

SUMMARY OF THE INVENTION

The invention concerns a method for testing carburetors in which the carburetor operation can be monitored under a variety of simulated engine operating conditions, including dynamic response to changes in operating conditions, utilizing a minimum amount of structural hardware. By so doing, proper functioning of the carburetor over a range of actual operating conditions can be assured.

More particularly, a method according to the invention uses a flow-testing bench having three critical flowthrough nozzles and a fuel flow measuring device connected to the fuel delivery line of the carburetor. The first and second critical flowthrough nozzles are connected on opposite sides of the carburetor, and the third critical flowthrough nozzle by-passes the carburetor to supply air on the downstream side thereof. The critical flowthrough nozzles have adjustable cross-sections, so as to change the rate of air throughput at critical flowthrough conditions. By adjusting the cross-section of the first nozzle, a precise air flow rate through the carburetor may be selected. Similarly, the third critical flowthrough nozzle may be adjusted to obtain a predetermined value of pressure at the output side of the carburetor, that value being a function of the air throughput rate of the third nozzle.

In accordance with the invention, the first critical flowthrough nozzle, the third critical flowthrough nozzle, and the carburetor throttle valve are set to provide a predetermined set of flow conditions. Thereafter, the flow conditions are changed in a predetermined manner by varying either individually or simultaneously the settings of the first nozzle, the third nozzle, and the throttle valve. During the testing procedure, the rate of fuel flow into the carburetor is monitored, so as to determine the carburetor operation at selected operating conditions or to determine the dynamic response of the carburetor.

Unlike the method for testing carburetors described in U.S. Pat. No. 4,041,777, in a method according to the invention the throttle valve of the carburetor is not controlled as an adjustment element in a closed-loop control, to correct for differences between actual pressures and desired pressures. Rather, the throttle valve is adjusted arbitrarily during execution of the testing operation. As a result of the use of critical flowthrough nozzle arrangements, defined air throughputs through the carburetor can be set by regulating the first critical flowthrough nozzle, independent of the pressure value (which may be adjusted by the third critical flowthrough nozzle) downstream of the carburetor.

BRIEF DESCRIPTION OF THE DRAWING

FIG. 1 is a schematic diagram of a carburetor to be tested and a flow-testing bench therefor.

DETAILED DESCRIPTION OF THE PREFERRED EMBODIMENT

In FIG. 1, the carburetor 1 to be tested is placed between a first critical flowthrough nozzle arrangement D1 and a second critical flowthrough nozzle arrangement D2. Air, which has been dried, is supplied at a controlled temperature and pressure to the critical flowthrough nozzle D1 from a pressure-regulated reservoir. The second critical flowthrough nozzle D2, which is disposed on the outlet side of the carburetor 1, is connected to a vacuum air pump 2. Consequently, flow in the direction of the arrow is produced.

The carburetor 1 contains the customary butterfly or throttle valve 3 and fuel metering device (not shown), which in a known manner meters fuel as a function of the prevailing negative pressure in the carburetor. The fuel metering device is connected to a fuel delivery line 4. In the fuel delivery line 4 there is a fuel flow measuring device 5, which measures the fuel flow rate ṁK. A third critical flowthrough nozzle arrangement D3 is connected in parallel to the carburetor 1 and the first critical flowthrough nozzle D1. The nozzle acts as a by-pass to supply air to the output side (downstream) of the carburetor 1, upstream of the second nozzle D2.

As used herein, the term "critical flowthrough nozzle arrangement" or the like means nozzles having a variable cross-section in which critical flowthrough conditions are maintained, for example, needle nozzles or an arrangement of cooperating fixed cross-section nozzles which can be connected and disconnected in various combinations in order to obtain different flow cross-sections.

Testing of the carburetor 1 is effected at a plurality of carburetor air flowthrough rates, downstream pressures (i.e. downstream of the throttle valve 3), and throttle settings. Each parameter is set as herein described. By adjusting the flow cross-section of the first critical flowthrough nozzle D1, a predetermined throughput through the nozzle D1, and thereby a defined rate of air flow $\dot{m}l$ through the carburetor 1, will occur. Through variation of the flow cross-section of the third critical flowthrough nozzle D3, the corresponding air throughput $\dot{m}3$ is varied, which will result in an adjustment of the pressure P in the direction of flow behind the carburetor 1, to a predefined value. Moreover, the testing bench is arranged to provide a control for adjusting the angle of the throttle valve 3 to predefined positions.

In testing of a carburetor, the openings of the first and third nozzles, and the throttle valve position, are preferably varied in accordance with predetermined time functions so that the carburetor is tested successively at different combinations of the three influencing variables in conformity with a test program. Thus, the values of each combination may be adjusted synchronously in time and thereby, contrary to pure pressure regulation, simulate the actual operation of a carburetor in an engine.

At various combinations of air flow $\dot{m}l$, pressure P, and throttle valve position the fuel flow rate $\dot{m}K$ is measured, using flow meter 5. In order to determine whether the carburetor is functioning properly, the fuel-to-air mixture ratio is determined by dividing the measured fuel flow $\dot{m}K$ by the air flow $\dot{m}l$ (the latter being determined as a function of the position of the needle in the element D1).

The method will be advantageously practiced by using a conventional computer. A control program for varying the values of air flow $\dot{m}l$, pressure P, and throttle valve position, in a predetermined manner and as a function of time, may be stored in the computer. Additionally, the fuel flow meter is preferably connected to supply an input signal to the computer, such that the computer determines the fuel-to-air ratio automatically.

The measured fuel flow rate or air-fuel-to ratio, for various static or dynamic flow conditions, may be compared with that of a model carburetor for similar flow conditions, to assure proper functioning of the tested carburetor.

The foregoing represents a preferred embodiment of the invention. Variations and modifications will be apparent to persons skilled in the art without departing from the inventive concepts disclosed herein.

I claim:

1. A method for testing a carburetor for an internal combustion engine, said carburetor having an air intake passage, an adjustable throttle valve, and a pressure responsive fuel metering device, comprising the steps of:

connecting a supply of fuel to said fuel metering device;

arranging a first critical flowthrough nozzle means and a second critical flowthrough nozzle means upstream and downstream, respectively, of said carburetor, wherein said first critical flowthrough nozzle means has an adjustable flow cross-section for regulating air throughput through said carburetor;

arranging a third critical flowthrough nozzle means, in parallel with said carburetor and said first nozzle means for supplying air downstream of said carburetor, wherein said third nozzle means has an adjustable flow cross-section for regulating air pressure downstream of said carburetor;

setting a plurality of combinations of air throughput through said carburetor, downstream air pressure, and throttle valve position, for establishing a plurality of flow conditions in said carburetor; and measuring the fuel throughput to said metering device at a plurality of said combinations of settings.

* * * * *